(No Model.)

G. L. DONOVAN.
MIRROR HINGE.

No. 285,239. Patented Sept. 18, 1883.

UNITED STATES PATENT OFFICE.

GEORGE L. DONOVAN, OF MERIDEN, CONNECTICUT, ASSIGNOR TO C. ROGERS & BROS., OF SAME PLACE.

MIRROR-HINGE.

SPECIFICATION forming part of Letters Patent No. 285,239, dated September 18, 1883.

Application filed August 6, 1883. (No model.)

*To all whom it may concern:*

Be it known that I, GEORGE L. DONOVAN, of Meriden, in the county of New Haven and State of Connecticut, have invented a new Improvement in Mirror-Pivots; and I do hereby declare the following, when taken in connection with accompanying drawings and the letters of reference marked thereon, to be a full, clear, and exact description of the same, and which said drawings constitute part of this specification, and represent, in—

Figure 1:
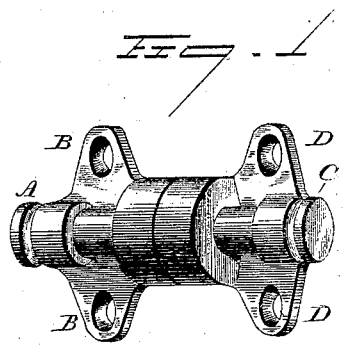
Figure 2:
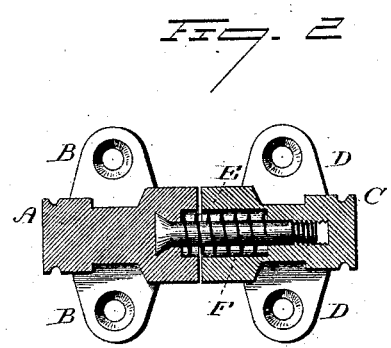

Figure 1, a perspective view; Fig. 2, a vertical central section.

This invention relates to an improvement in the pivot for hanging mirrors, as in dressing-cases, so that the mirror may be turned to different inclinations and held at any desired position, the object of the invention being to make the pivot adjustable, so as to increase or decrease the friction; and it consists in the construction as hereinafter described, and more particularly recited in the claim.

A is the one part, provided with ears B, by which it may be attached to the mirror-frame or upright; C, the other part, provided with like ears D, by which it may be attached. The one part A is provided with a pintle, E, extending axially from it, and screw-threaded at its extreme end. This pintle is firmly attached to the part A, which may be conveniently and well done in the process of casting. The other part, C, is constructed with a concentric chamber, F, through which the pintle extends, and in the bottom of the chamber a hole is made concentric with the chamber and corresponding in diameter to the body of the pintle, and so that when the two parts are set together the pintle will have a bearing in the part C. Below this bearing part in the part C the hole is screw-threaded, corresponding to the screw-thread on the pintle, and so that when the two parts are together, as seen in Fig. 2, the screw-thread will serve to hold the two parts from separation, and yet the part C will have a bearing upon the pintle, so that the parts may turn readily, the one upon the other. Within the chamber F a helical spring is arranged around the pintle, which takes its bearing respectively against the bottom of the chamber and the end of the other part, A, and as the two parts are screwed together the spring is compressed. The power of the spring therefore to force the two parts asunder is increased as the two parts are drawn together, or diminished as they are separated; hence the pressure of the spring may be adjusted to make the friction between the spring and the two parts greater or less, as may be required. This adjustment is desirable, if not necessary, in order that the pivot may be adapted to various sizes and weights of mirrors, as a lighter mirror requires less friction upon the pivot than a heavy mirror.

I claim—

The herein-described mirror-pivot, consisting of the two parts, A C, the one provided with an axial screw-threaded pintle, E, the other constructed with a spring-chamber, F, through which the said pintle passes, and also constructed with a bearing upon said pintle, and with a screw-threaded hole to receive the screw-threaded portion of the pintle, combined with a helical spring in said chamber, arranged to bear in a longitudinal direction upon the two parts A C, and so that the power of the spring may be adjusted by means of the screw-threaded pintle in one part, and correspondingly screw-threaded hole in the other part, substantially as described.

GEO. L. DONOVAN.

Witnesses:
GEORGE A. FAY,
CHARLES H. SAWYER.